United States Patent [19]

Havemann et al.

[11] Patent Number: 5,046,326
[45] Date of Patent: Sep. 10, 1991

[54] TRANSPORT REFRIGERATION SYSTEM

[75] Inventors: Robert K. Havemann; Loyal V. Pittman, both of Bloomington, Minn.

[73] Assignee: Thermo King Corporation, Minneapolis, Minn.

[21] Appl. No.: 603,033

[22] Filed: Oct. 24, 1990

[51] Int. Cl.⁵ .................. F25D 17/06; F25B 27/00; F16D 33/06
[52] U.S. Cl. .................................. 62/180; 62/186; 62/228.4; 62/323.1; 62/239; 60/358
[58] Field of Search ............ 62/180, 179, 186, 323.1, 62/323.4, 228.4, 133, 192, 193, 243, 239; 60/339, 347, 355, 357, 358, 359; 192/103 F, 103 FA, 104 F

[56] References Cited

U.S. PATENT DOCUMENTS

| 3,200,603 | 8/1965 | Wake et al. | 62/193 X |
|---|---|---|---|
| 3,415,072 | 12/1968 | White | 62/239 |
| 3,435,612 | 4/1969 | Hensler | 60/358 X |
| 3,465,538 | 9/1969 | Wunder | 62/323.1 |
| 3,483,852 | 12/1969 | Newman et al. | 60/358 X |
| 3,512,373 | 5/1970 | White | 62/239 |
| 3,563,355 | 2/1971 | Goodson et al. | 192/104 F |
| 4,348,871 | 9/1982 | Androff | 62/239 |
| 4,365,484 | 12/1982 | Carson et al. | 62/239 |
| 4,551,986 | 11/1985 | Anderson et al. | 62/239 |
| 4,770,002 | 9/1988 | Viegas et al. | 62/239 |
| 4,787,214 | 11/1988 | Stillwell | 62/180 X |
| 4,878,360 | 11/1989 | Viegas | 62/239 |
| 4,912,933 | 4/1990 | Renken | 62/81 |
| 4,922,727 | 5/1990 | Viegas | 62/239 |

Primary Examiner—Harry B. Tanner
Attorney, Agent, or Firm—D. R. Lackey

[57] ABSTRACT

A transport refrigeration system having an evaporator, an evaporator blower, a variable speed drive for the evaporator blower, a refrigerant compressor, and a prime mover for the compressor which includes an internal combustion engine having an output shaft, a pressurized oil lubrication system and an oil sump. The variable speed drive includes a fluid coupling which utilizes oil provided by the lubrication system of the internal combustion engine.

11 Claims, 2 Drawing Sheets

5,046,326

TRANSPORT REFRIGERATION SYSTEM

TECHNICAL FIELD

The invention relates in general to transport refrigeration systems, and more specifically to transport refrigeration systems in which a refrigerant compressor is driven by an internal combustion engine.

BACKGROUND ART

As used throughout the specification and claims, the term "blower" means any suitable air delivery unit, including centrifugal blowers and axial flow fans.

U.S. Pat. Nos. 4,878,360 and 4,922,727, which are assigned to the same assignee as the present application, disclose a transport refrigeration system which includes a refrigerant compressor, an internal combustion engine, such as a Diesel engine, for driving the compressor, a condenser, a condenser blower, an evaporator, an evaporator blower, and an adjustable speed arrangement for the evaporator blower. The adjustable speed arrangement of the '360 patent includes a variable pulley, the pitch diameter of which is selected by a linear actuator. The adjustable speed arrangement of the '727 patent includes an electric clutch and a one-way clutch. As pointed out in these U.S. Patents, it is beneficial to be able to control the speed of the evaporator blower independently of the speed of the engine, as the air requirements of the served load are not always directly proportional to engine speed.

The speed of an internal combustion engine driving a refrigerant compressor is conventionally controlled to one of two speeds, called "high speed" and "low speed", such as 2200 RPM and 1400 RPM., for example, the selection of which is automatically made by a thermostat in response to the deviation of the temperature of the served load from the desired or set point temperature. When the thermostat senses that the temperature of the load in the served space has entered a predetermined range close to the desired or "set point" temperature, the engine speed is dropped from high to low speed. It is desirable for the speed of the condenser blower to also drop when the engine speed drops to low speed, as the refrigeration capacity is reduced. However, it may or may not be desirable for the speed of the evaporator blower to also drop, depending upon the characteristics of the served load. Thus, the evaporator blower may have a drive arrangement, such as taught by the aforesaid patents, which maintains the air flow constant regardless of whether the engine is operating at high or low speed. During defrost of the evaporator coil, no air circulation through the served load is desired at all, and it is common to close shutters located between the evaporator blower and the served space to prevent the air from the evaporator blower from entering the served space during defrost.

While the adjustable speed evaporator blower arrangements of the aforesaid patents provide the desired function of being able to select the speed of the evaporator blower independently of the engine speed, it would be desirable and it is an object of the present invention to provide an infinitely variable speed drive for the evaporator blower which is easier to set up, adjust and control, and which will be easier to maintain.

SUMMARY OF THE INVENTION

Briefly, the present invention is a new and improved transport refrigeration system having an evaporator, an evaporator blower, a variable speed drive for the evaporator blower, and a refrigerant compressor driven by an internal combustion engine. The internal combustion engine has an output shaft, a pressurized oil lubrication system, and a crankcase having an oil sump.

The variable speed drive for the evaporator blower includes an input shaft, a hydraulic clutch or fluid coupling, and at least one output shaft. The input shaft of the fluid coupling is connected to the output shaft of the internal combustion engine, either directly or via a pulley arrangement, as desired. The at least one output shaft is connected to the evaporator blower. The fluid coupling is connected to receive oil from the oil lubrication system of the internal combustion engine, and to return oil to the oil sump.

The variable speed drive controls the rate at which oil is allowed to return to the oil sump according to a comparison between the actual speed of the evaporator blower, provided by an actual speed sensor, and the desired speed, provided by the refrigeration system controller. In a preferred embodiment, a normally open controllable valve is disposed in the oil return line from the fluid coupling to the oil sump, which, when completely open, results in a substantially zero output speed from the fluid coupling. The normally open valve position is used during defrosting of the evaporator coil, eliminating the need for air dampers or shutters between the evaporator blower and the load.

When engine speed changes, there is never a need to provide a new desired speed signal if constant evaporator air is desired, as the comparison between actual and desired evaporator blower speeds will automatically provide an error signal which will control the valve to maintain the desired speed of the evaporator blower. Changing evaporator blower speeds is easily and quickly achieved, simply requiring that the refrigeration system controller provide a new desired speed signal for comparison with the actual speed signal being generated by the actual speed sensor. This control arrangement is ideal for a microprocessor based refrigeration controller, but may be used with any type of controller.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

U.S. Pat. Nos. 4,551,986 and 4,912,933 disclose a transport refrigeration system of the type which may be modified to utilize the teachings of the invention, which patents are assigned to the same assignee as the present application. U.S. Pat. Nos. 4,551,986 and 4,912,933 are hereby incorporated into the specification of the present application by reference.

Figure 1:
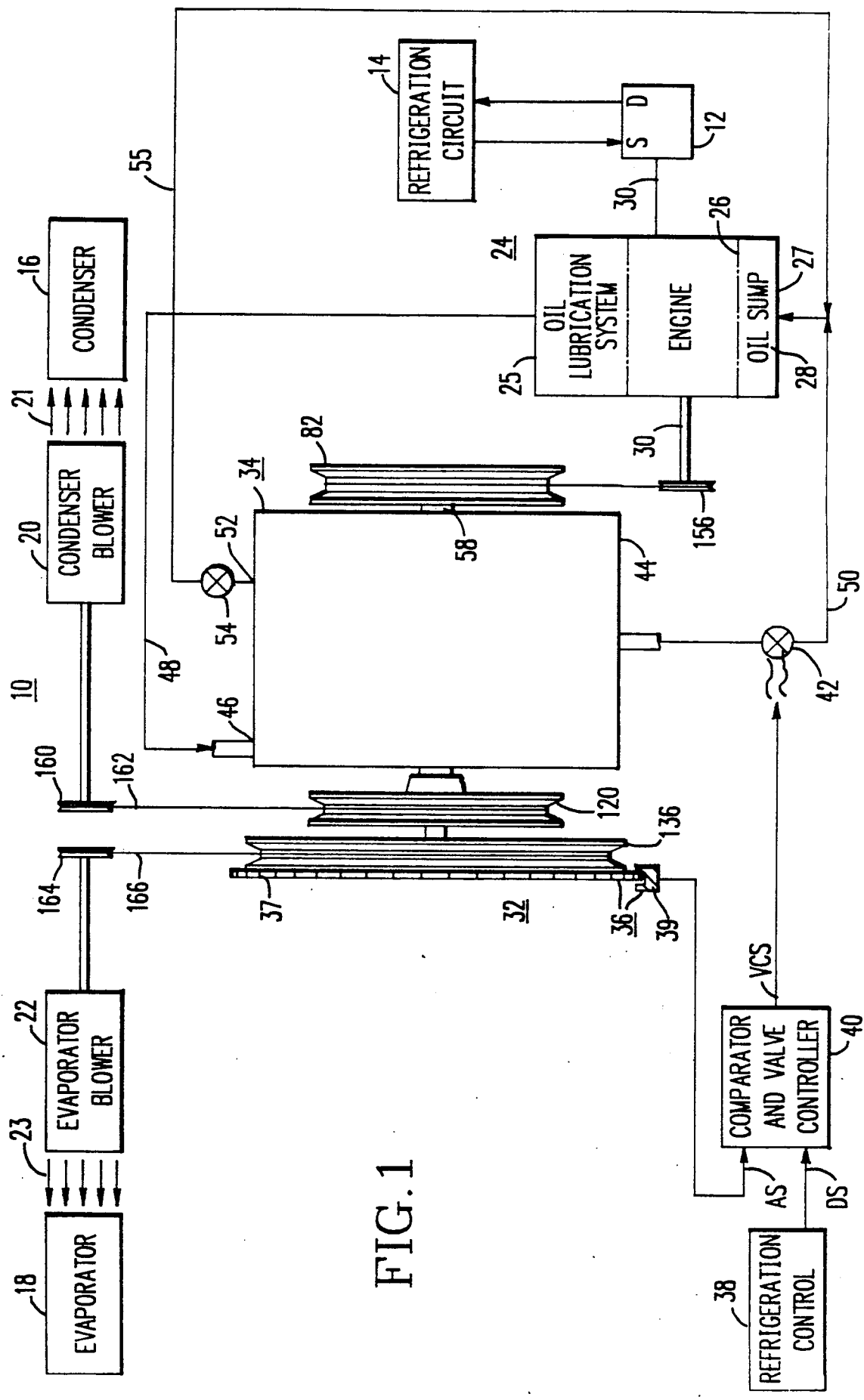
FIG. 1 is a partially schematic and partially block diagram of a transport refrigeration system having a variable speed evaporator blower speed control arrangement constructed according to the teachings of the invention.

Referring now to the drawings, and to FIG. 1 in particular, there is shown a transport refrigeration system 10 constructed according to the teachings of the invention. Transport refrigeration system 10 includes refrigerant compressor 12 having a discharge port D connected to provide high pressure gaseous refrigerant to a closed refrigeration circuit, shown generally at 14, and a suction port S which receives low pressure gaseous refrigerant from refrigerant circuit 14. A condenser 16 and an evaporator 18 are part of the refrigeration circuit 14, but they are shown separately in order to illustrate associated condenser and evaporator blowers 20 and 22, respectively. Condenser blower 20 provides air 21 for condenser 16, and evaporator blower 22 provides air 23 for evaporator 18.

A prime mover for refrigerant compressor 12 includes an internal combustion engine 24, such as a Diesel engine, having a conventional pressurized oil lubrication system 25 which uses oil, indicated generally with broken line 26, in a crankcase 27 having an oil sump 28. Engine 24 has an output shaft 30 connected to drive refrigerant compressor 12.

Transport refrigeration system 10 includes a variable speed drive arrangement 32 for evaporator blower 22, with the variable speed drive arrangement also having means for driving condenser blower 20 at a speed proportional to the speed of engine 24. Variable speed drive arrangement 32 includes a fluid coupling 34; actual speed detector means 36, such as an electronic or optical based toothed wheel detector system having a toothed wheel 37 and a tooth detector 39 which provides a signal AS responsive to the actual speed of the evaporator blower 22; refrigeration control means 38 which provides a signal DS representative of the desired speed of evaporator blower 22; and, comparator and valve control means 40 responsive to signals AS and DS for providing a valve control signal VCS for controlling a controllable valve 42. Controllable valve 42 is preferably a normally open valve, i.e., valve 42 is open when no electrical signal is applied to it. Valve 42 may be a solenoid operated on-off valve which controls average flow rate according to the ratio of open to closed time; or, it may be an electrically operated valve in which the degree of closing from the normally open position towards a closed position is proportional to the value or magnitude of an electrical signal, e.g., the magnitude of the current flowing through the valve.

Fluid coupling 34 includes a housing 44 having an oil inlet 46 connected to receive oil from the pressurized oil lubrication system 25 of engine 24 via an oil line 48. Inlet 46 and oil line 48 are sized to meter the amount of oil 26 being diverted from engine 24. Housing 44 also has an oil outlet 49 connected to return oil to oil sump 28 via a return oil line 50 which includes the hereinbefore mentioned controllable valve 42. Housing 44 may also include an oil outlet 52 connected to a pressure relief valve 54 and an overflow oil return line 55 which returns oil to the oil sump 28 without going through controllable valve 42. The setting of valve 54 determines the maximum oil pressure which is allowed to build up within fluid coupling 34, to protect associated oil seals. Alternatively, control valve 42 may have a built-in pressure relief feature, such as an adjustable spring release member which opens the valve to limit the maximum oil pressure. In this event, valve 54 and oil return line 55 would not be required.

Figure 2:
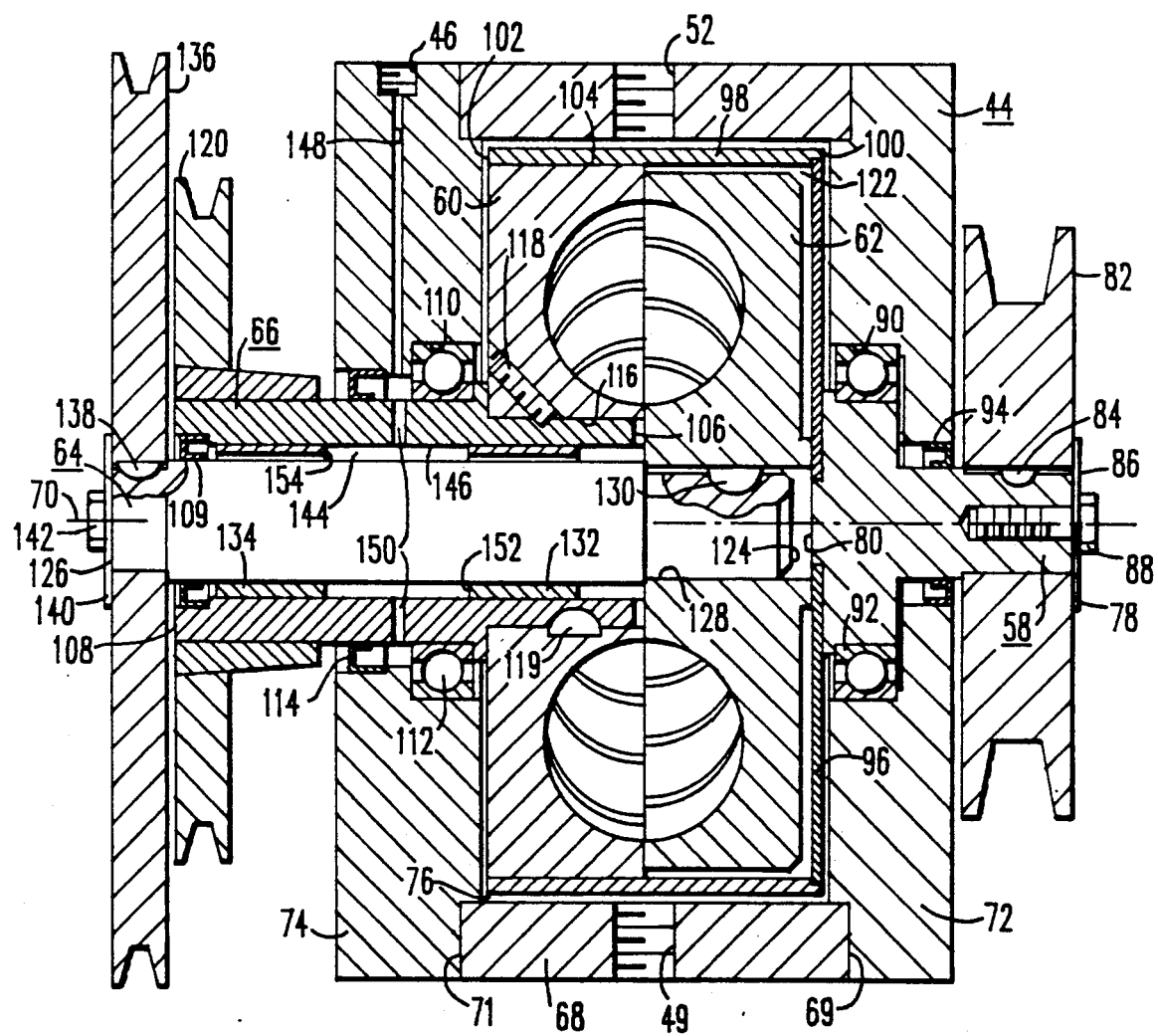
FIG. 2 is a vertical sectional view taken through a fluid coupling shown in FIG. 1.

Fluid coupling 34, as best shown in the vertical cross sectional view thereof in FIG. 2, includes an input shaft 58, an externally driven portion 60 of the fluid coupling 34, which will be referred to as impeller 60, an internally driven runner portion 62 of fluid coupling 34, which will be referred to as turbine 62, a first output shaft 64, and a second output shaft 66.

Housing 44 includes a cylindrical, tubular intermediate body portion 68 having a longitudinal axis 70. Body portion 68 has first and second axial ends 69 and 71 closed by first and second end cap members 72 and 74, respectively. Body portion 68 and the first and second end cap members 72 and 74 cooperatively form a cavity 76 which surrounds the impeller 60 and turbine 62.

Input shaft 58 has first and second axial ends 78 and 80, respectively, with the first end having a pulley 82 suitably fixed thereto, such as with a key 84, a plate 86 and a bolt 88. Input shaft 58 is journalled for rotation within a central opening 90 of the first end cap member 72, such as via a ball bearing assembly 92 and a shaft seal 94. The second end 80 of input shaft 58 is coupled to the impeller 60.

In a preferred embodiment, the coupling arrangement between input shaft 58 and impeller 60 also provides an inner housing for surrounding the turbine 62. More specifically, the coupling arrangement includes a flat, circular drive plate 96 fixed to end 80 of input shaft 58, and a drive ring 98 in the form of a cylindrical tubular member having first and second axial ends 100 and 102, respectively. The first end 100 of drive ring 98 is closed by the drive plate 96, and the second end 102 surrounds and engages the periphery 104 of the impeller 60.

The second output shaft 66 has first and second axial ends 106 and 108, respectively, and a longitudinally extending opening 109 which extends between its ends. The second output shaft 66 is journalled for rotation within a central opening 110 in the second end cap member 74, such as via ball bearing assembly 112 and shaft seal 114. Impeller 60 has a central opening 116 within which the first axial end 106 of the second output shaft 66 is fixed, such as via a screw 118 and a key 119. A pulley 120 is fixed to the second output shaft 66, adjacent to the second axial end 108.

The impeller 60, drive ring 98 and drive plate 96 cooperatively define a cavity 122 within which turbine 62 is disposed. The first output shaft 64 has first and second axial ends 124 and 126, respectively, with the first axial end being fixed within a central opening 128 in turbine 62, such as with a key 130. The first output shaft 64 is coaxially disposed within the longitudinal opening 109 in the second output shaft 66 and journalled for independent rotation within the second output shaft 66 via first and second spaced bearings 132 and 134, respectively. The second end 126 of the first output shaft 64 extends outwardly past the second end 108 of the second output shaft 66, and a pulley 136 is fixed adjacent to end 126, such as with a key 138, plate 140 and bolt 142.

Bearings 134 and 136, which are disposed between the outer surface 144 of the first output shaft 64 and the inner surface 146 defined by longitudinal opening 109, require lubrication. Such lubrication is provided regardless of the output speed of turbine 62, by directing the engine oil 26 which is delivered to oil inlet 46 through the bearings 132 and 134, before the oil is delivered to the impeller 60. An opening 148 in the second end cap 74 directs oil 26 to openings 150 through the wall of the second output shaft 66, which openings 150 are located between bearings 132 and 134. Bearings 132 and 134 may be needle bearings which allow oil to pass therethrough, or, as illustrated, they may be sleeve bearings having a plurality of circumferentially spaced longitudinally extending grooves 152 and 154, respectively.

The input shaft 58 is driven at a speed proportional to the speed of engine 24 via a pulley 156 and a belt 158 which links pulley 82. The input shaft 58 drives impeller 60, and impeller 60 drives the second output shaft 66 and pulley 120. Pulley 120 is linked to the condenser blower 20 via a pulley 160 associated with the condenser blower 20 and a belt 162 which links pulley 160 with pulley 120. Thus, condenser blower 20 is driven at a speed proportional to the speed of engine 24.

Oil 26 enters inlet 46, and it is directed via an opening 148 in end cap member 74 through bearing assembly 112 to surround the rotating intermediate housing defined by impeller 60, drive plate 96 and drive ring 98, which arrangement results in pumping oil to the bearing assembly 92. When valve 42 is completely open, oil 26 returns to oil sump 28 via oil outlet 49, oil line 50 and valve 42 at the same rate that it is delivered to fluid coupling 34, and oil and associated oil pressure for operating the fluid coupling does not build up, resulting in no rotation of the first output shaft 64. As hereinbefore stated, this mode is used when refrigeration system 10 goes into a defrost operation to defrost the evaporator coil 18. Delivering oil 26 to fluid coupling 34 faster than it is allowed to return to oil sump 28 causes oil and associated oil pressure to build up within coupling 34 and the speed of the first output shaft 64 increases accordingly. Any output speed may be selected, up to the maximum speed achieved when the fluid coupling 34 is filled with oil 26 and operating at a predetermined oil pressure which produces maximum torque. In one embodiment of fluid coupling 34, maximum output torque was achieved at an oil pressure of 12 psi. Pulley 136 on the first output shaft 64 is linked to a pulley 164 via a belt 166, and thus evaporator blower 22 is operated at a speed proportional to the speed of the first output shaft 64.

It will first be assumed that the refrigeration system 10 is operating at low speed, e.g., 1400 RPM, and the controller 38 provides a signal DS having a magnitude indicating that the maximum desired RPM for the evaporator blower 22 is desired. The actual speed sensor 36 will provide a signal AS that indicates the speed of the evaporator blower 22 is less than the speed indicated by the desired speed signal DS, and comparator and valve controller 40 will provide a signal VCS which closes valve 42. Fluid coupling 34 will fill completely with oil 26 and it will bring the speed of the first output shaft 64 up to the maximum which the fluid coupling 34 will deliver. The various pulley ratios are preferably selected such that output speed of the first output shaft 64 provides the desired maximum air flow rate from evaporator blower 22 when the fluid coupling 34 is filled with oil and engine 24 is operating at low speed.

When the thermostat associated with refrigeration system 10 switches engine 24 to high speed, e.g., 2200 RPM, engine 24 will speed up and take the evaporator blower 22 above the maximum desired RPM. Fluid coupling 34, however, is deliberately selected to have a relatively small size, such as about 6 inches in diameter, which will prevent any dramatic increase in blower RPM. The power requirements to drive the evaporator blower 22 rise with the cube of the speed, and the fluid coupling 34 will slip before any undesirable over-speed condition is reached. During this time, the speed sensor 36 detects the fact that the actual blower speed has increased above the desired blower speed, and comparator and valve controller 40 will open valve 42, dropping the blower speed. Valve 42 may be operated in an on/off mode within a predetermined range of the desired speed of the evaporator blower 22, to provide the desired average speed, or, the size of the valve opening may be continuously controlled to hold the actual speed very close to the desired speed, as desired. The amount of speed drop with on/off control of valve 42 is determined by the oil flow rate into the fluid coupling 34 versus the amount of oil drain back allowed by the gravity restriction of the return oil circuit.

We claim:

1. A transport refrigeration system having an evaporator, an evaporator blower, a condenser, a condenser blower, and a refrigerant compressor driven by an internal combustion engine, with the internal combustion engine having an output shaft, a pressurized oil lubrication system and a crankcase having an oil sump, the improvement comprising:

a variable speed drive for the evaporator blower which includes an input shaft, a fluid coupling, a first output shaft, and a second output shaft concentric with the first output shaft, said input shaft being connected to the output shaft of the internal combustion engine, said fluid coupling including an impeller connected to said input shaft, a turbine connected to said first output shaft, a housing surrounding said impeller and turbine, an oil inlet on said housing, and an oil outlet on said housing, said first coupling being connected to receive oil from the oil lubrication system of the internal combustion engine via said oil inlet, and to return oil to the oil sump via said oil outlet, said first output shaft being connected to the evaporator blower, and said second output shaft being connected to the condenser blower.

2. A transport refrigeration system having an evaporator, an evaporator blower, and a refrigerant compressor driven by an internal combustion engine, with the internal combustion engine having an output shaft, a pressurized oil lubrication system and a crankcase having an oil sump, the improvement comprising:

a variable speed drive for the evaporator blower which includes an input shaft, a fluid coupling, a first output shaft, and a second output shaft concentric with said first output shaft, with said second output shaft and said first output shaft being coupled by bearing means, said input shaft being connected to the output shaft of the internal combustion engine, said fluid coupling including an impeller connected to said input shaft, a turbine connected to said first output shaft, a housing surrounding said impeller and turbine, an oil inlet on said housing, and an oil outlet on said housing, said fluid coupling being connected to receive oil from the oil lubrication system of the internal combustion engine via said oil inlet, and to return oil to the oil sump via said oil outlet, said first output shaft being connected to the evaporator blower, and including means directing oil from the oil inlet to the impeller through said bearing means, to lubricate said bearing means without regard to the speed of the turbine.

3. The transport refrigeration system of claim 2 wherein the speed of the second output shaft is directly proportional to the speed of the internal combustion engine, and including a condenser, a condenser blower, and means connecting the second output shaft to the condenser blower.

4. The transport refrigeration system of claim 2 including pressure limiting means disposed to limit the maximum oil pressure in the fluid coupling.

5. The transport refrigeration system of claim 4 wherein the pressure limiting means includes an oil return line connected between the fluid coupling and the oil sump of the internal combustion engine, and pressure relief valve means connected in said oil return line.

6. The transport refrigeration system of claim 2 wherein the housing includes first and second axial ends,
    means journaling the input shaft for rotation at the first axial end of the housing,
    said input shaft having a first end coupled to the output shaft of the internal combustion engine and a second end within the housing,
    the fluid coupling further including a plate member and a tubular member disposed to connect the second end of the input shaft to the impeller.

7. The transport refrigeration system of claim 2 including oil return conduit means for directing oil from the oil outlet on the housing to the oil sump of the internal combustion engine, with the variable speed drive including a controllable valve in the oil return conduit means.

8. The transport refrigeration system of claim 7 wherein the controllable valve is a normally open valve, with the speed of the turbine being substantially zero when the controllable valve is in the normally open position.

9. The transport refrigeration system of claim 7 wherein the variable speed drive includes means providing a first signal proportional to the actual speed of the evaporator blower, means providing a second signal proportional to the desired speed of the blower, and comparison means responsive to said first and second signals for providing a signal which controls the controllable valve.

10. A transport refrigeration system having an evaporator, an evaporator blower, a condenser, a condenser blower, and a refrigerant compressor driven by an internal combustion engine, with the internal combustion engine having an output shaft, a pressurized oil lubrication system and a crankcase having an oil sump, the improvement comprising:
    a variable speed drive for the evaporator blower which includes an input shaft, a fluid coupling, a first output shaft, and a second output shaft,
    said input shaft being connected to the output shaft of the internal combustion engine,
    said first output shaft being connected to the evaporator blower,
    said fluid coupling including an impeller connected to the input shaft, a turbine connected to said first output shaft, a housing having first and second axial ends, said housing surrounding said impeller and turbine, an oil inlet on said housing connected to receive the oil from the internal combustion engine, and an oil outlet on said housing connected to return the oil to the crankcase of the internal combustion engine,
    means journaling the input shaft for rotation at the first axial end of the housing,
    said input shaft having a first end coupled to the output shaft of the internal combustion engine and a second end within the housing,
    said fluid coupling including a plate member and a tubular member disposed to connect the second end of the input shaft to the impeller,
    and means journaling the second output shaft for rotation at the second axial end of the housing, with the second output shaft having a first end within the housing connected to the impeller and a second end outside the housing operatively linked to the condenser blower, wherein the speed of the condenser blower is proportional to the speed of the internal combustion engine.

11. The transport refrigeration system of claim 10 wherein
    the turbine is disposed within a cavity cooperatively formed by the plate member, the tubular member, and the impeller.

* * * * *